United States Patent
Wise et al.

(10) Patent No.: US 6,362,423 B1
(45) Date of Patent: Mar. 26, 2002

(54) PLANAR MEMBER FOR AN ELECTRICAL ENCLOSURE

(75) Inventors: Randall Wise, New Ulm, MN (US); Michael Tobin, Burlington, CT (US); Adam Mongeau, North Mankato; Steven Stenzel, Good Thunder, both of MN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/672,414

(22) Filed: Sep. 28, 2000

(51) Int. Cl.[7] .................................................. H01J 15/00
(52) U.S. Cl. .................... 174/50; 174/58; 220/4.02; 361/752
(58) Field of Search ..................... 174/48, 50, 52.1, 174/58, 63, 17 R, 60; 220/4.02, 3.8; 361/752; 312/223.1; 439/926

(56) References Cited

U.S. PATENT DOCUMENTS

| | | | | |
|---|---|---|---|---|
| 5,245,507 A | * | 9/1993 | Ericksen | 361/641 |
| 5,272,279 A | * | 12/1993 | Filshie | 174/50 |
| 5,682,016 A | * | 10/1997 | James et al. | 174/52.1 |
| 5,894,408 A | * | 4/1999 | Stark et al. | 361/704 |

* cited by examiner

Primary Examiner—Dean A. Reichard
Assistant Examiner—Dhiru R Patel
(74) Attorney, Agent, or Firm—Cantor Colburn LLP

(57) ABSTRACT

A planar member for use in a support structure, the planar member includes a plurality of apertures which are positioned to align with a set of openings in a wall of the support structure, the set of openings corresponding to a predetermined configuration of electrical components to be installed into the support structure. The number of openings in the wall are larger than the plurality of apertures in the planar member.

24 Claims, 6 Drawing Sheets

PLANAR MEMBER FOR AN ELECTRICAL ENCLOSURE

BACKGROUND

This invention relates to electrical enclosures, and more particularly, to a planar member for use with an enclosure capable of accommodating various electrical component configurations.

Electrical enclosures of similar size and shape are used in many different applications. Accordingly, these enclosures are fitted with a plurality of prepositioned openings to allow different types of components to be secured within the enclosure in a variety of configurations. Circuit breakers, various types of communication ports, and different electrical components may be installed in the enclosure and are secured through the pre-positioned openings with fastening means such as screws.

Depending on the type, number, and configuration of electrical components secured in the enclosure, a number of openings will remain unused and exposed. Electrical codes require that these unused holes be covered.

One method of covering these unused and exposed openings is the use of vinyl adhesive-backed dots which are manually placed over the holes. Applying these adhesive dots is very labor intensive, and can cause confusion as to which of the openings are to be covered. Moreover, in the event the assembler forgets to cover an opening which had to be covered, the openings have to be reworked, which again increases the cost of assembly and manufacturing.

SUMMARY OF THE INVENTION

In an exemplary embodiment of the invention, a planar member for use in a support structure is provided. The support structure includes a back wall having a plurality of openings. The planar member includes a plurality of apertures which are positioned to align with the plurality of openings on the wall of the support structure when the planar member is secured to the wall. The plurality of apertures correspond to the anticipated openings to be used, while the remaining plurality of openings is covered by the planar member.

The above-described and other features and advantages of the present invention will be appreciated and understood by those skilled in the art from the following detailed description, drawings, and appended claims.

BRIEF DESCRIPTION OF THE DRAWINGS

The present invention will now be described, by way of example, with reference to the accompanying drawings in which.

DESCRIPTION OF THE PREFERRED EMBODIMENT

In order to provide an understanding of the invention, the invention is described in terms of application and use with respect to a six-unit, twenty-four hole standard sized electrical enclosure. It will be understood that this is but one configuration and size intended to be within the scope of the present invention.

Figure 1:
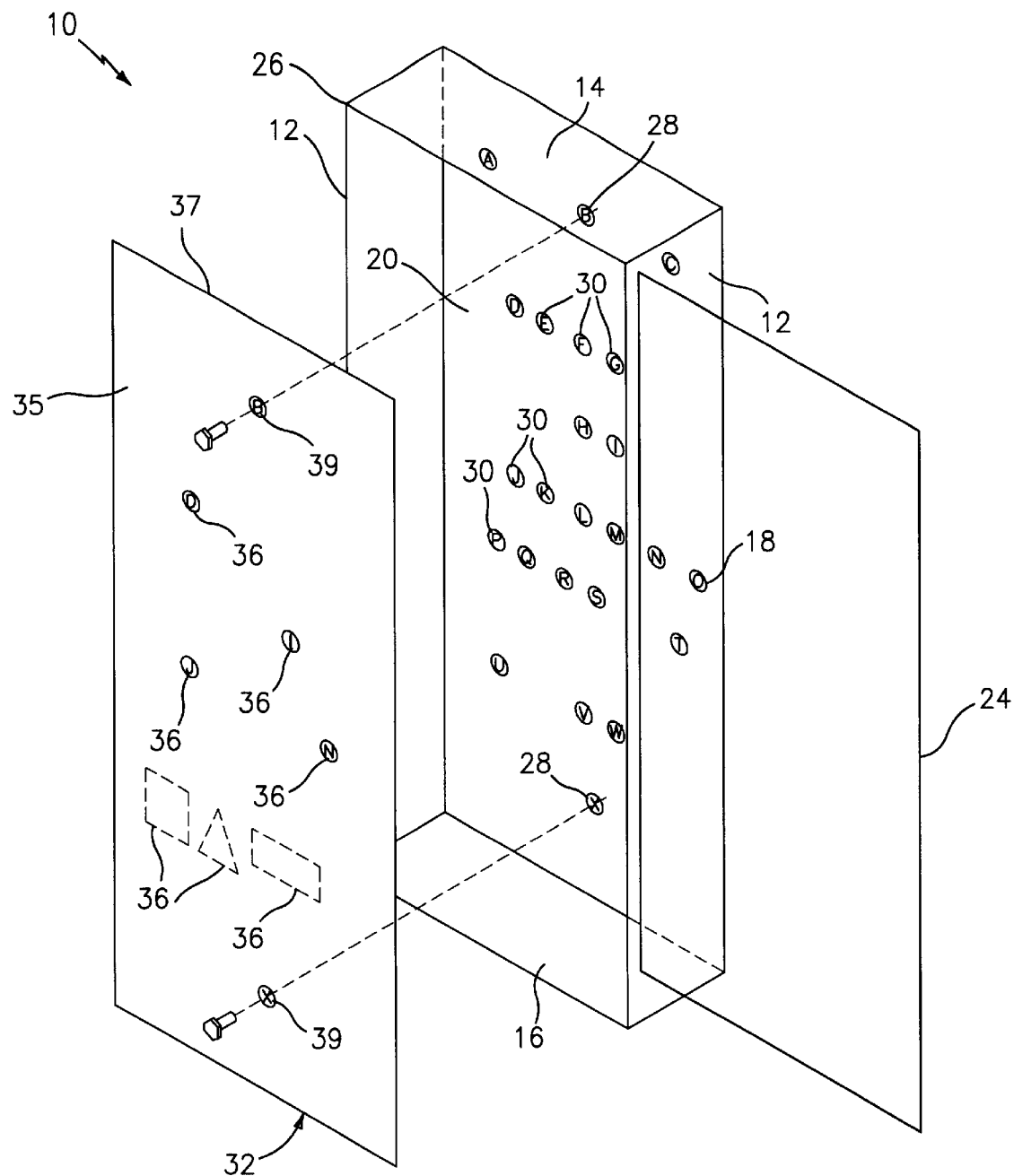
FIG. 1 is an exploded perspective view of an electrical enclosure with a planar member according to one embodiment of the present application.
Figure 2:
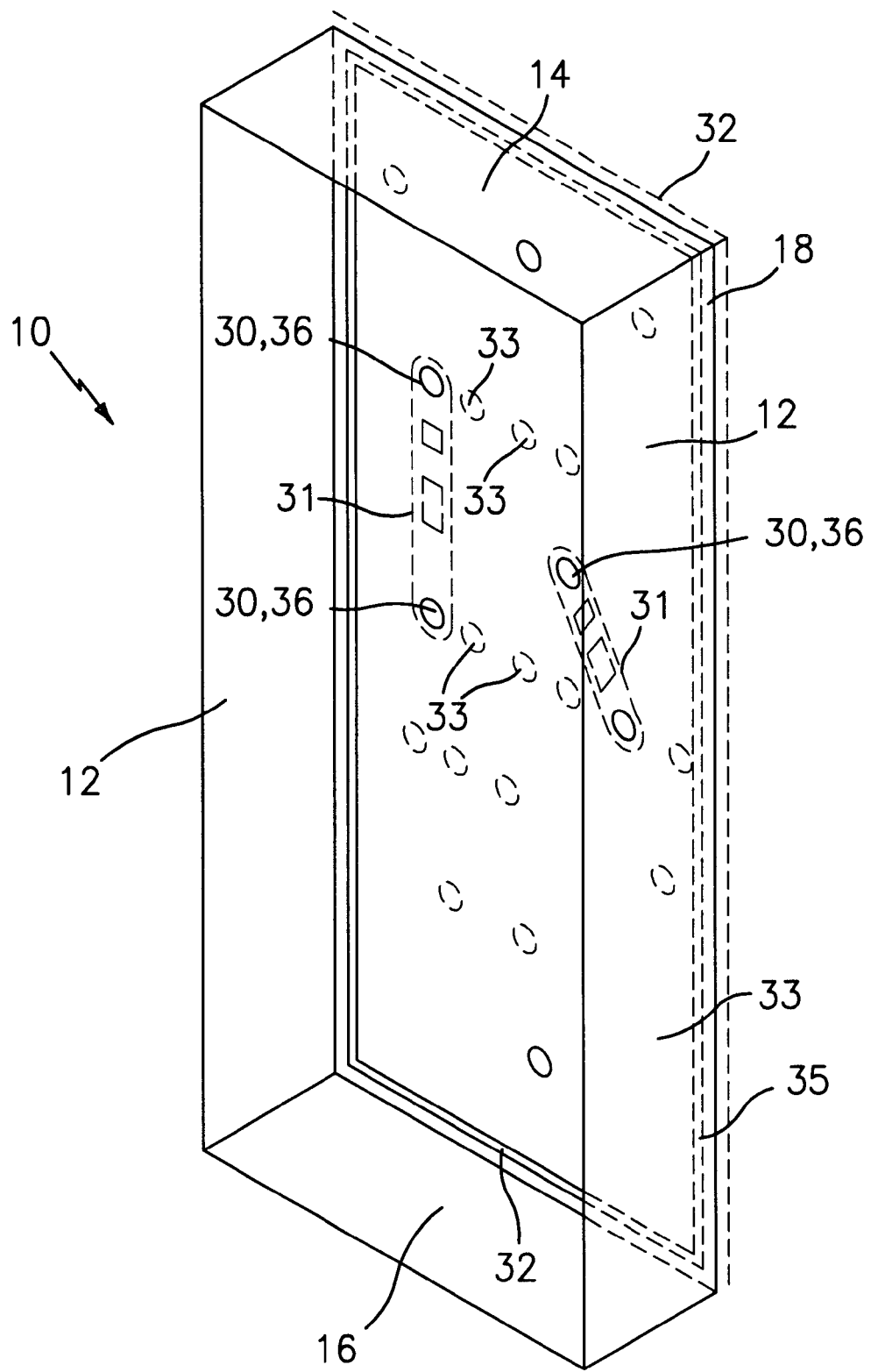
FIG. 2 is a perspective view of an electrical enclosure with a planar member of FIG. 1 installed inside the electrical enclosure.

Referring to FIGS. 1 and 2, an electrical enclosure is generally illustrated at 10. Electrical enclosure 10 has a rectangular shape having a pair of elongated sidewalls 12, a top wall 14, a bottom wall 16, and a back wall 18. Enclosure 10 defines a receiving area 20 into which a plurality of electrical components are to be installed and enclosed.

Electrical enclosure 10 may further include a hinged access door 24 for securely closing off receiving area 20 and which allows user manipulation of electrical components inside.

Electrical enclosure 10 is installed in residential or commercial buildings by being directly secured on a wall. Alternatively, electrical enclosure 10 may be embedded into a wall opening 26 with the opening of the enclosure providing a flush fit with the wall. Of course, electrical enclosure 10 may be used in numerous applications and installation configurations. Electrical enclosure 10 is used in indoor and outdoor applications and provides protection against dust, dirt, oil and water from the electrical components inside.

Electrical enclosure 10 further includes a plurality of mounting apertures 30 prepunched on back wall 18. Each mounting aperture 30 is configured to receive a securing means for securing electrical components 31, such as circuit breakers and various types of communication ports, with electrical enclosure 10. Mounting apertures 30 are prepunched during the manufacturing of enclosure 10.

As various electrical components are installed in the electrical enclosure in a variety of configurations, some of the apertures will not be used, and will remain open and exposed. Electrical codes require that these apertures be covered to effectively seal off the electrical enclosure.

In accordance with an embodiment of the present invention, a planar member 32 has a predetermined and prepunched number of apertures exposing a portion of the openings in electrical enclosure 10. In an exemplary embodiment, planar member 32 is a fiber sheet that has nonconductive and nonabsorbent qualities. Planar member 32 provides an aperture-covering configuration to be installed on back wall 18 of the electrical enclosure, thereby exposing mounting apertures 30 used for installation of electrical components and covering the unused apertures. Planar member 32 also provides an insulating function in that the unused openings are sealed off by planar member 32 and moisture is prevented from entering enclosure 10 through the unused openings.

Planar member 32 is preferably made of an insulative material such as plastic, fiberglass, urea formaldehyde, melamine formaldehyde or any other insulative material. In an exemplary embodiment, planar member 32 is constructed out of a nonabsorbent, nonconductive material. As illustrated herein, planar member 32 is rectangular and is configured and dimensioned to be installed on the back wall inside the receiving area of the electrical enclosure. Alternatively, planar member 32 may be installed to an exterior 19 of the electrical enclosure 10 on the back wall 18. Of course, other shapes and configurations of the planar member 32 such as oval, circular, and hexagonal for covering some apertures while exposing others are contemplated to be within the scope of the present invention.

Planar member 32 has a first surface 33 and a second surface 35. Second surface 35 is laid over on back wall 18 when planar member is installed in the electrical enclosure.

Planar member 32 further includes a plurality of holes 34 extending from first surface 35 through second surface 37. Each hole 34 allows a fastening means such as a screw or fastener to pass through back wall 18 and planar member 32, to secure planar member 32 inside electrical enclosure 10. As best seen in FIG. 2, each hole 34 overlays on a corresponding installation hole 28, where the mounting template and the electrical enclosure can be installed together on the wall or separately.

In one embodiment, planar member 32 is manufactured with a plurality of prepunched mounting apertures 36, also extending from first surface 35 through second surface 37. The mounting apertures are specifically arranged according to a specific configuration of the electrical components to be installed. Mounting apertures 36 are preferably circular in shape and are similar to the size to the openings 30, although other shapes such as rectangular or triangular are contemplated to be within the scope of the present invention.

Referring to FIG. 2, and for example illustrative purposes, if an assembler desires to install two circuit breakers inside electrical enclosure 10, a planar member is provided with a prepunched aperture configuration conforming to the installation configuration of the two circuit breakers. Therefore, by installing planar member 32 on back wall 18 of the electrical enclosure having a plurality of mounting apertures 30, only the necessary apertures on the back wall that are required for the installation of the two circuit breakers will be exposed and the other apertures on the back wall will be covered by the planar member, as illustrated at 33, from exposure to moisture and water. The preselect aperture configurations can be produced during manufacture, and accordingly, the most commonly used configurations can be premade.

The use of planar member 32 inside electrical enclosure 10 also prevents any confusion for the user as to which mounting apertures 30 on the back wall are needed to be used, and which mounting apertures 30 on the back wall are needed to be covered.

The planar member allows manufacturers to design and manufacture a single electrical enclosure, and use the enclosure for various uses, thereby reducing the manufacturing cost of different electrical enclosures for different applications. For example, wall 18 of electrical enclosure 10 is manufactured with a plurality of openings identified as A through X for total of 24 openings, which relate to six different unique configurations of four holes each. Of course, many alternative configurations of enclosure 10 and openings 30 are contemplated to be within the scope of the invention. Accordingly, and in order to save manufacturing costs wall 18 is prepunched with holes A–X, thus enclosure 10 can be used in a variety of configurations. However, not all of the holes are utilized in the various configurations therefore, the unused holes must be sealed off in accordance with regulatory requirements.

Thus, a plurality of planar members 32 may be used with the same electrical enclosure while providing a variety of installation configurations. This will allow the assembler to use the correct holes for installation in a particular unit.

Figure 5:
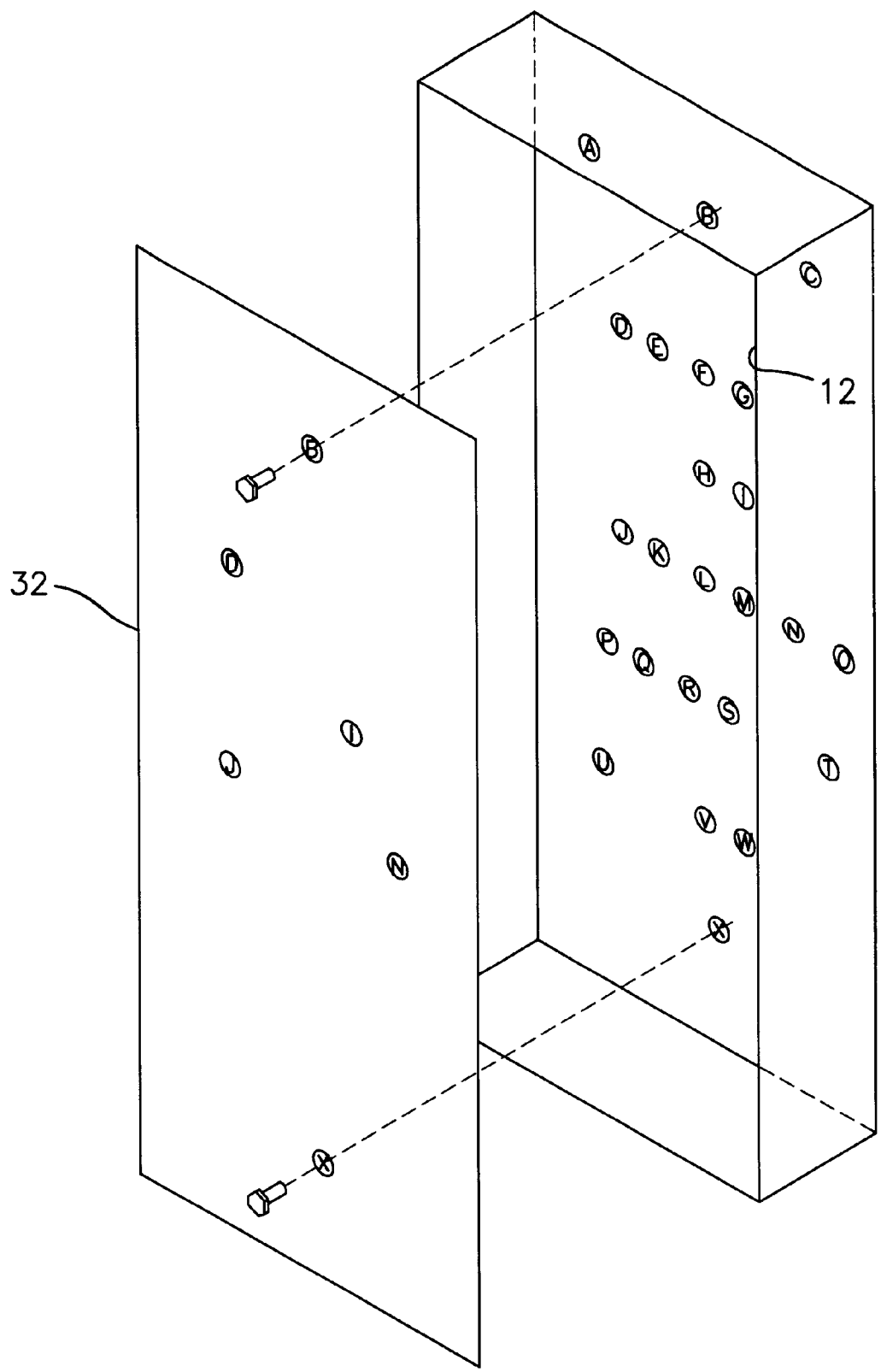
FIG. 5 is a perspective view of an alternative embodiment.

For example, and referring now to FIGS. 1 and 5, planar member 32 has an alternative configuration with openings "F" and "J" instead of openings "D" and "I" (FIG. 1). Accordingly, the planar member of FIG. 5 easily allows a different installation configuration to be used with the same electrical enclosure as illustrated in FIG. 1. Thus, and through the use of planar member 32, a plurality of electrical enclosures with a plurality of openings corresponding to multiple installation configurations may be used without increasing the associated labor time and/or costs. In fact, the use of plurality of planar members 32 having different opening configurations with a plurality of enclosures having the same opening configurations will eliminate labor intensive tasks such as determining which openings in enclosure 32 to use or leave open.

Thus, electrical enclosure 10 can be manufactured with a plurality of openings corresponding to a plurality of preselected installation configurations, which may relate to the most common installation configurations for a particularly sized unit.

Accordingly, using a fiber sheet or planar member 32 in place of covers or screws increases the number of mounting hole combinations that can be added to a body without confusing assemblers. By condensing the number of bodies or enclosures produced creates cost justification to carry some bodies as stock and or hard tooled which decreases the time it takes to ship a product from the time an order is placed.

In addition, the use of planar member 32 or fiber sheet 32 instead of a plurality of white dots with a vinyl adhesive backing ensures that all of the correct holes are covered and only the necessary holes are left open for the assemblers to use. This eliminates the rework of white dots, and decreases final production time.

Figure 6:
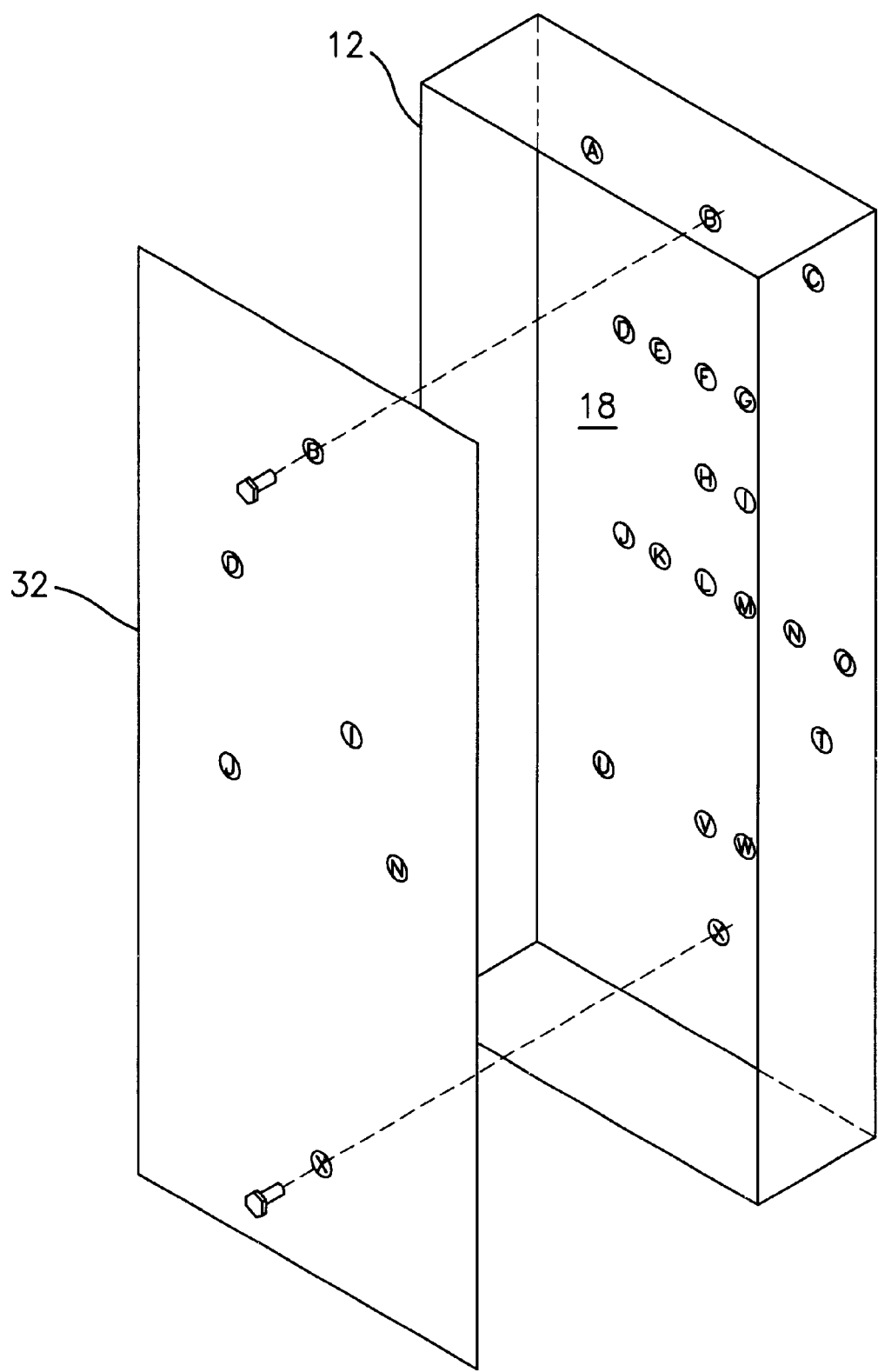
FIG. 6 is a perspective view of an alternative embodiment.

As an alternative, and referring now to FIG. 6, wall 18 of enclosure 10 has a different configuration, namely, and for illustration purposes only, the lack of holes P, Q, R and S. However, planar member 32 still has the same configuration, holes D, I, J and N, as in FIG. 1, which may still be employed with the enclosure illustrated in FIG. 6. Accordingly, planar member 32 may be used in conjunction with electrical enclosures having a plurality of dissimilar hole configurations as long as the electrical enclosures have the same openings as planar member 32.

In addition, planar member 32 can be used as a template for determining whether the proper enclosure is being used for the configuration on member 32. For example, and referring now to FIG. 6, if planar member 32 is inserted into enclosure 10 and there is no corresponding "N" hole in wall 18 of enclosure 10, the same is not acceptable for the configuration contemplated by planar member 32.

Figure 3:
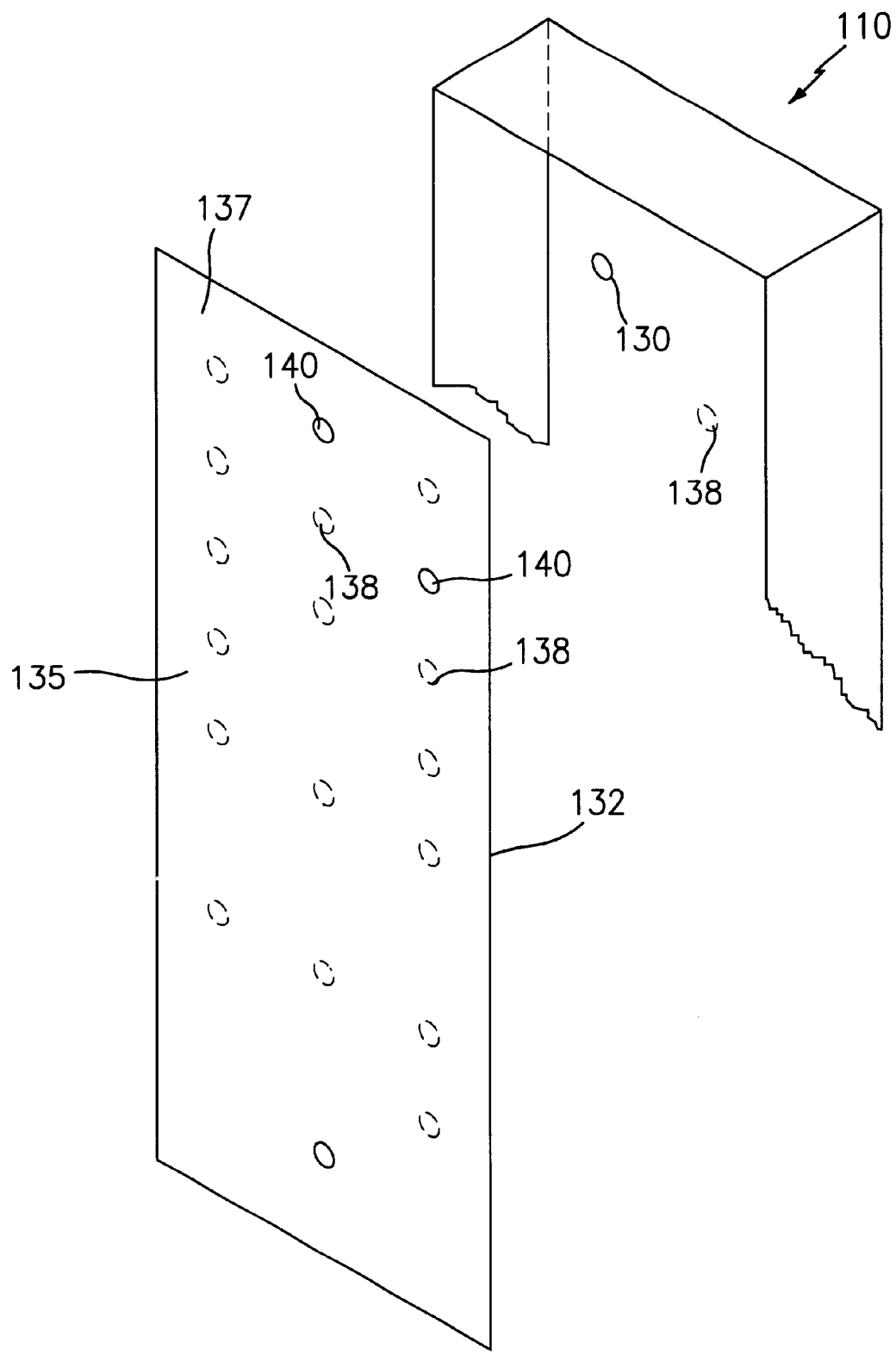
FIG. 3 is a perspective view of an alternative embodiment of the planar member.

Referring to FIG. 3, an alternative embodiment of the present invention is illustrated. Here, component parts performing similar or analogous functions are numbered in multiples of 100. In this embodiment, planar member 132 comprises a plurality of perforated sections 138. The removal of each perforated section 138 exposes an opening 140 extended from a first surface 135 to a second surface 137. Each opening 140 conforms to the size and dimension of mounting aperture 130 on the back wall. Each opening 140 overlays a corresponding mounting aperture 130 when planar member is installed on the back wall.

Each perforated section 138 is removed by a user according to a desired configuration by pushing out the perforated section. This allows the user to utilize electrical enclosure 110 for use for different electrical components installed in different arrangements by simply removing as many perforated sections 138 as required to provide for the installation of the electrical components.

Figure 4:
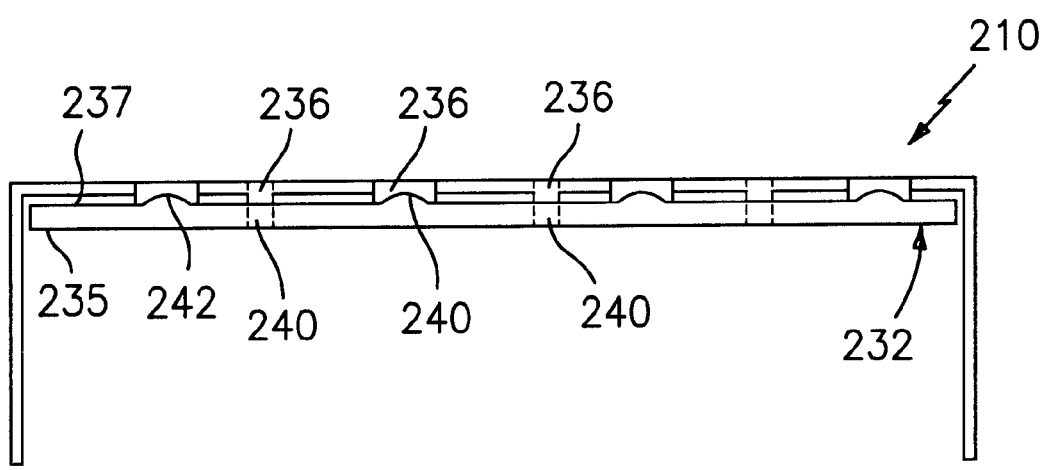
FIG. 4 is a side view of a yet another alternative embodiment of the planar member.

Referring to FIG. 4, yet another alternative embodiment of the present invention is illustrated. Here, component parts performing similar or analogous functions are numbered in multiples of 200. In this embodiment, planar member 232 comprises a plurality of protrusions 242 disposed on a second surface 237. Each protrusion 242 preferably has a circular shape, the removal of which results in an opening 240 extending from a first surface 235 to second surface 237. Each opening 240 is used to receive a securing means such as a screw for installing electrical components.

Each protrusion 242 may be removed during the manufacturing process of the planar member according to a user's specification for installing different electrical components, or alternatively, each protrusion 242 may be perforate at the circumference, allowing the user to push out each protrusion 242 to create opening 240.

Moreover, each protrusion 242 is received within a corresponding aperture 30 on the back wall of the electrical enclosure when the planar member is installed in the electrical enclosure. The protrusions provide a guide for the correct installation of the planar member and provide an error proof installation means for the user.

Effectively covering the unused apertures on the back wall inside the electrical enclosure individually is costly and labor intensive. And in the event of there being numerous unused apertures, the user may encounter the probability of missing a cover to one of the apertures, or perhaps covering the wrong aperture needed to be used for the installation of an electrical component.

The use of planar member 32 allows manufacturers to design and manufacture a single electrical enclosure and use the enclosure for various different uses, thereby reducing the manufacturing cost of different individual electrical enclosures for different applications.

Moreover, utilizing the planar member instead of single adhesive covering dots ensures that all of the unused apertures are correctly covered and only the necessary apertures are left exposed for the assemblers to use. This reduces the time and labor for configuring the electrical enclosure for installation of different electrical components.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A planar member, comprising:
   a plurality of apertures in said planar member, said plurality of apertures being positioned to align with a plurality of openings in a wall of a support structure, the number of said plurality of apertures being less than the number of said plurality of openings defining unused openings, said planar member being configured, dimensioned, and positioned to provide an insulating function for covering said unused openings.

2. The planar member as in claim 1, wherein said planar member is constructed out of a non-conductive material.

3. The planar member as in claim 1, wherein said plurality of apertures are circular.

4. A planar member, comprising:
   a first plurality of openings in a wall of an enclosure, said first plurality of openings having a first set of openings, said first set of openings corresponding to an installation configuration of a plurality of electrical components for installation in said enclosure; and
   a plurality of mounting apertures in said planar member, said plurality of mounting apertures aligning with at least some of said first set of openings when said planar member is secured to said wall, and said planar member being configured, dimensioned, and positioned to provide an insulating function for covering said first set of openings not aligning with said plurality of mounting apertures.

5. The planar member as in claim 4 wherein said planar member is secured to said wall on an interior surface of said enclosure.

6. The planar member as in claim 4 wherein said planar member is secured to said wall on an exterior of said enclosure.

7. The planar member as in claim 4 wherein said enclosure is an electrical enclosure.

8. The planar member as in claim 2, further comprising a plurality of perforated sections, each perforated section corresponding to each of said plurality of openings, when said planar member is secured to said wall.

9. The planar member as in claim 8, further comprising a plurality of protrusions disposed on a mounting surface of said planar member, said plurality of protrusions being configured, dimensioned and positioned to be disposed in a corresponding opening of said first plurality of openings on said wall, when said planar member is secured to said wall.

10. The planar member as in claim 9, wherein said first plurality of openings have a second set of openings, said second set of openings not including said first set of openings and said plurality of protrusions being received within said second set of openings.

11. The planar member as in claim 10, wherein said planner member is constructed out of a nonconductive, nonabsorbent material.

12. The planar member as in claim 4 further comprising a plurality of protrusions disposed on a mounting surface of said planar member, said plurality of protrusions being configured, dimensioned and positioned to be disposed in a corresponding opening of said first plurality of openings on said wall, when said planar member is secured to said wall.

13. The planar member as in claim 12 wherein said planar member is constructed out of a nonabsorbent material.

14. The planar member as in claim 4 wherein said planar member is constructed out of a nonabsorbent material.

15. The planar member as in claim 4 wherein said enclosure is an electrical enclosure and said first plurality of openings are created during the manufacture of said enclosure.

16. The planar member as in claim 15, wherein said plurality of mounting apertures are configured to correspond to said installation configuration.

17. The planar member as in claim 15, wherein said electrical enclosure is constructed out of steel.

18. The planar member as in claim 17, wherein said planar member is constructed out of a nonconductive material.

19. The planar member as in claim 18, wherein said planar member is constructed out of a plastic material.

20. A method for selectively covering a plurality of openings in an electrical enclosure, comprising:
    inserting a planar member into a receiving area of an enclosure, said planar member having a plurality of openings being configured and dimensioned to align with at least some of a set of openings in a wall of said enclosure, and said planar member covering and insulating said set of openings not aligned with said plurality of openings, said set of openings corresponding to a predetermined configuration of electrical components to be installed within said enclosure.

21. A planar member, comprising:

a first plurality of openings in a wall of an enclosure, said first plurality of openings having a first set of openings, said first set of openings corresponding to an installation configuration for installation of a plurality of electrical components in said enclosure;

a plurality of mounting apertures in said planar member, said plurality of mounting apertures aligning with said first set of openings when said planar member is secured to said wall;

a plurality of perforated sections, each of said perforated sections corresponding to each of said plurality of openings, when said planar member is secured to said wall; and a plurality of protrusions disposed on a mounting surface of said planar member, said plurality of protrusions being configured, dimensioned and positioned to be disposed in a corresponding opening of said first plurality of openings on said wall, when said planar member is secured to said wall.

22. The planar member as in claim 21, wherein said first plurality of openings have a second set of openings, said second set of openings not including said first set of openings and said plurality of protrusions being received within said second set of openings.

23. The planar member as in claim 22, wherein said planner member is constructed out of a nonconductive, nonabsorbent material.

24. A planar member, comprising:

a first plurality of openings in a wall of an enclosure, said first plurality of openings having a first set of openings, said first set of openings corresponding to an installation configuration of a plurality of electrical components for installation in said enclosure;

a plurality of mounting apertures in said planar member, said plurality of mounting apertures aligning with said first set of openings when said planar member is secured to said wall; and a plurality of protrusions disposed on a mounting surface of said planar member, said plurality of protrusions being configured, dimensioned and positioned to be disposed in a corresponding opening of said first plurality of openings on said wall, when said planar member is secured to said wall.

* * * * *